Patented Mar. 11, 1952

2,588,949

UNITED STATES PATENT OFFICE 2,588,949

DELAYED ACTION COAGULANT AND METHOD OF COAGULATION

Jerome C. Westfahl, Cuyahoga Falls, Ohio, assignor to The B. F. Goodrich Company, New York, N. Y., a corporation of New York No Drawing. Application April 2, 1947, Serial No. 738,946

17 Claims. (Cl. 260—821)

This invention relates to a coagulant for latex and is particularly concerned with a delayed action coagulant for an aqueous dispersion of natural or synthetic rubber.

Latex is ordinarily coagulated by a material which is readily ionizable in the aqueous phase of the latex dispersion, and which, as a consequence, instantaneously coaguates latex in contact with the material. Thus, for example, rubber latex is ordinarily coagulated with an acid such as hydrochloric acid or acetic acid, or by a soluble polyvalent metal salt such as calcium nitrate or a similar material.

In some cases, however, it is desirable to employ a delayed action coagulant which can be completely admixed with the latex dispersion and which undergoes a measurable induction period before coagulation begins to take place so that the entire mass is coagulated uniformly. This is particularly true in the case of the so-called "foamed" latex wherein air is whipped into the latex until a semi-stable foam is obtained or where a gas-forming material is incorporated into the latex and the resulting mixture is treated to cause emission of a gas in the body of the latex until a foam is obtained. Conventional instantaneous coagulants are not suitable for coagulating the foam while retaining the cellular structure. Obviously the instantaneous coagulants cannot be incorporated in the latex before foaming; and if the foam is sprayed with coagulant, the outer layer is instantly coagulated but the interior portion must remain uncoagulated until the coagulant has diffused through the mass. This is necessarily a slow process and the semi-stable foam does not retain its original foamed structure. It is, therefore, desirable to have a material which may be incorporated in the latex before foaming and which thereafter uniformly coagulates the entire foamed mass at a measurable rate.

I have discovered that a halogenated hydrocarbon free from ethylenic unsaturation having a halogen atom joined directly to a tertiary carbon atom may be incorporated in a latex without instantly coagulating the latex but that it will completely and rapidly coagulate the latex after the lapse of a measurable time interval. The use of such a halogenated hydrocarbon allows the latex to be foamed before coagulation begins; and once the induction period has passed the coagulation proceeds rapidly before the foam structure collapses.

A compound embodying this invention is substantially un-ionized in aqueous media. Such a compound is molecularly hydrolyzed by water particularly in basic aqueous media such as is common in a rubber latex dispersion. A tertiary hydrocarbon halide probably effects coagulation of the latex by liberation of a halogen acid in the hydrolysis reaction. The particular reason why a compound embodying this invention undergoes a measurable induction period, however, is not understood, and the invention will not be limited by any theory which might be advanced in explanation of this phenomenon. This behavior is unexpected, however, in view of the hydrolysis rate of other halogenated hydrocarbons in which a labile halogen atom is present but not joined to a tertiary carbon atom. The following table illustrates the peculiar behavior in basic aqueous media of a tertiary alkyl halide as compared to a few typical compounds which also undergo molecular hydrolysis and which contain a labile halogen atom not joined to a tertiary carbon atom. The values given in the table are the pH values of the aqueous media at various time intervals following the addition of the halogenated hydrocarbon to the media.

TABLE I

| Time (min.) | t-Butyl chloride | Benzal chloride | Methallyl chloride | Allyl chloride |
|---|---|---|---|---|
| 0 | 11.65 | 11.70 | 11.50 | 11.50. |
| 0.5 | | 11.50 | 11.45 | Below 3.0. |
| 1.75 | 11.50 | | | |
| 2.0 | 2.80 | 11.28 | | |
| 4.0 | | 11.00 | 11.27 | |
| 6.0 | | 10.20 | 10.98 | |
| 8.0 | | | 5.50 | |
| 10.0 | | 4.90 | 4.40 | |
| 12.0 | | 4.70 | | |

As can readily be seen from Table I, the tertiary butyl chloride has a substantial induction period during which time the pH remains practically unchanged. Following the induction period, the pH falls rapidly and coagulation of latex is quickly effected so that a firm coagulated structure is obtained without substantial collapse of the foam structure.

It can also be seen from Table I that materials such as allyl chloride which contain an extremely labile halogen atom which is joined to a primary or secondary carbon atom undergo no such induction period and thus are unsuitable as delayed action coagulants. Furthermore, primary or secondary alkyl halides are unsuitable for use in practising this invention.

Any halogenated hydrocarbon free from ethylenic unsaturation having a halogen atom joined directly to a tertiary carbon atom, may be used in practising this invention. Of such compounds, the halogenated alkanes are particularly suitable as typified by such compounds as tertiary butyl chloride, tertiary butyl bromide, tertiary butyl fluoride, tertiary amyl chloride, dimethyl ethyl chloromethane, 1,2-dichloroisobutane, diethyl propyl chloromethane, triethyl chloromethane and similar halogenated alkanes, particularly those having less than ten carbon atoms. If desired, however, halogenated hydrocarbons having the structure $R_3CX$ where R is either an alkyl or an aryl hydrocarbon group and X is a halogen atom may be used as, for example, triphenyl chloromethane, dimethyl phenyl bromomethane, diethyl phenyl chloromethane and similar compounds.

The compounds within the scope of this invention may be used as delayed action coagulants for any rubber latex, whether a natural or synthetic rubber latex, or for other latices containing dispersed polymeric organic compounds, as for example vinyl resin latices, etc. The latex is preferably stabilized against salt flocculation by the addition of a suitable protective colloid such as methyl cellulose, gelatin or similar stabilizing agent, and may also contain the commonly employed compounding ingredients for latex such as fillers, reinforcing pigments, vulcanization agents and accelerators therefor, emulsifying agents, etc.

The coagulant is preferably employed in an amount equal by weight to from 3% to 20% of the weight of the rubber in the latex to be coagulated although the amount used may be greater or less than this amount depending upon the pH of the original latex dispersion and the particular latex composition to be coagulated.

A typical latex composition containing a delayed action coagulant within the scope of this invention is illustrated by the following recipe which is merely included for purposes of illustration and is not intended to limit the invention.

*Example I*

50 gm. Hevea latex (60% T. S.)
5 ml. 5% methyl cellulose solution
2 ml. 50% Zinc oxide dispersion
5 ml. Tertiary butyl chloride All the above dispersions and solutions are in aqueous media. The above-mentioned constituents are thoroughly mixed and the latex is completely coagulated in 5 minutes from the time of incorporation of the tertiary butyl chloride in the latex. Coagulation begins after an initial induction period of 2 to 3 minutes. Similar results are obtained with other halogenated hydrocarbons free from ethylenic unsaturation in which a halogen atom is attached to a tertiary carbon atom, as well as with latices of other rubbers and organic polymers.

The invention has been described in detail with reference to the use of tertiary butyl chloride and a few typical examples of compounds embodying this invention have been set forth, but it will be understood that any suitable compound may be used as defined in the appended claims.

I claim:

1. The composition which comprises an acid-coagulable aqueous dispersion of polymeric organic material in combination with a halogenated hydrocarbon free from ethylenic unsaturation containing a maximum of 19 carbon atoms and having a halogen atom joined directly to a tertiary carbon atom, said halogenated hydrocarbon amounting to from 3% to 20% of the weight of said polymeric organic material.

2. The composition which comprises an acid-coagulable aqueous dispersion of rubbery material in combination with a halogenated alkane containing less than ten carbon atoms and having a halogen atom joined directly to a tertiary carbon atom, said halogenated alkane being present in an amount of from 3% to 20% the weight of said rubbery material.

3. The composition which comprises an acid-coagulable rubber latex in combination with from 3% to 20% by weight based on the weight of rubber of a compound having the composition

where $R_1$, $R_2$ and $R_3$ are hydrocarbon groups free from ethylenic unsaturation each containing a maximum of six carbon atoms and X is a halogen atom.

4. The composition which comprises an acid-coagulable rubber latex in combination with a tertiary alkyl halide containing less than ten carbon atoms, said tertiary alkyl halide being present in an amount of from 3% to 20% of the weight of the rubber in said latex.

5. The composition which comprises an acid-coagulable aqueous dispersion of rubber material and a molecularly hydrolyzable halogenated hydrocarbon free from ethylenic unsaturation containing a maximum of 19 carbon atoms and having a halogen atom joined directly to a tertiary carbon atom, said halogenated hydrocarbon amounting to 3% to 20% of the weight of said rubber material.

6. The composition which comprises an acid-coagulable aqueous dispersion of a rubber in combination with 3% to 20% by weight of tertiary butyl chloride based on the weight of said rubber.

7. The method of coagulating an acid-coagulable aqueous dispersion of polymeric organic material which comprises admixing with said dispersion from 3% to 20% by weight based on the weight of polymeric organic material of a molecularly hydrolyzable halogenated hydrocarbon free from ethylenic unsaturation containing a maximum of 19 carbon atoms and having a halogen atom joined directly to a tertiary carbon atom.

8. The method of coagulatnig an acid-coagulable aqueous dispersion of rubbery material which comprises dispersing in said aqueous dispersion from 3% to 20% by weight based on the weight of said rubbery material of a halogenated alkane containing less than ten carbon atoms and having a halogen atom joined directly to a tertiary carbon atom.

9. The method of coagulating an acid-coagulable rubber latex which comprises dispersing in said latex from 3% to 20% by weight based on the weight of rubber in said latex of a compound having the composition

where $R_1$, $R_2$ and $R_3$ are hydrocarbon groups free from ethylenic unsaturation each containing a maximum of six carbon atoms and X is a halogen atom.

10. The method of coagulating an acid-coagulable rubber latex which comprises dispersing therein from 3% to 20% by weight of a tertiary alkyl halide containing less than ten carbon atoms based on the weight of rubber in said latex.

11. The method of coagulating an acid-coagulable aqueous dispersion of rubber material which comprises dispersing therein from 3% to 20% by weight based on the weight of said rubber material of a molecularly hydrolyzable halogenated hydrocarbon free from ethylenic unsaturation containing a maximum of 19 carbon atoms and having a halogen atom joined directly to a tertiary carbon atom.

12. The method of coagulating an acid-coagulable aqueous dispersion of a rubber which comprises dispersing therein from 3% to 20% by weight of tertiary butyl chloride based on the weight of said rubber.

13. The method of coagulating an acid-coagulable aqueous dispersion of rubbery material which comprises associating therewith from 3 to 20% by weight based on the weight of said rubbery material of a tertiary alkyl chloride containing less than ten carbon atoms.

14. The composition which comprises an acid-coagulable rubber latex in combination with from 3% to 20% by weight, based on the weight of rubber, of a compound having the composition

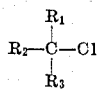

where $R_1$, $R_2$ and $R_3$ are hydrocarbon groups free from ethylenic unsaturation each containing a maximum of six carbon atoms.

15. The method of coagulating an acid-coagulable rubber latex which comprises dispersing in said latex from 3% to 20% by weight, based on the weight of rubber in said latex, of a compound having the composition

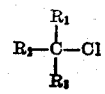

where $R_1$, $R_2$ and $R_3$ are hydrocarbon groups free from ethylenic unsaturation each containing a maximum of six carbon atoms.

16. The composition which comprises Hevea latex in combination with from 3% to 20% by weight, based on the weight of rubber in said latex, of a compound having the composition

where $R_1$, $R_2$ and $R_3$ are hydrocarbon groups free from ethylenic unsaturation each containing a maximum of six carbon atoms and X is a halogen atom.

17. The method of coagulating Hevea latex which comprises dispersing in said latex from 3% to 20% by weight, based on the weight of rubber in said latex, of a compound having the composition

where $R_1$, $R_2$ and $R_3$ are hydrocarbon groups free from ethylenic unsaturation each containing a maximum of six carbon atoms and X is a halogen atom.

JEROME C. WESTFAHL.

REFERENCES CITED

The following references are of record in the file of this patent:

UNITED STATES PATENTS

| Number | Name | Date |
|---|---|---|
| 1,936,106 | Crockett | Nov. 21, 1933 |
| 1,960,445 | McGavack | May 29, 1934 |
| 2,185,656 | Watermann et al. | Jan. 2, 1940 |

FOREIGN PATENTS

| Number | Country | Date |
|---|---|---|
| 533,669 | Great Britain | Feb. 18, 1941 |